(12) United States Patent
Shwartsman

(10) Patent No.: US 9,904,549 B2
(45) Date of Patent: Feb. 27, 2018

(54) METHOD AND APPARATUS FOR LOOP-INVARIANT INSTRUCTION DETECTION AND ELIMINATION

(71) Applicant: Intel Corporation, Santa Clara, CA (US)

(72) Inventor: Stanislav Shwartsman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 14/998,295

(22) Filed: Dec. 26, 2015

(65) Prior Publication Data

US 2017/0185407 A1 Jun. 29, 2017

(51) Int. Cl.
*G06F 9/30* (2006.01)
*G06F 12/0875* (2016.01)

(52) U.S. Cl.
CPC ........ *G06F 9/30145* (2013.01); *G06F 9/3001* (2013.01); *G06F 9/30043* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| | | | | |
|---|---|---|---|---|
| 5,455,924 A * | 10/1995 | Shenoy | ................ | G06F 9/3836 710/1 |
| 5,862,384 A * | 1/1999 | Hirai | ...................... | G06F 8/443 717/154 |
| 6,772,414 B1 * | 8/2004 | Roediger | ................ | G06F 8/433 717/150 |
| 6,910,121 B2 * | 6/2005 | Savransky | ............ | G06F 9/3836 712/218 |
| 8,935,684 B2 * | 1/2015 | Absar | ...................... | G06F 8/37 717/160 |
| 2006/0059475 A1 * | 3/2006 | Augusteijn | ......... | G06F 9/30098 717/155 |
| 2007/0226700 A1 | 9/2007 | Gal et al. | | |
| 2008/0195851 A1 * | 8/2008 | Hoogerbrugge | ........ | G06F 9/325 712/241 |
| 2013/0283014 A1 | 10/2013 | Wang et al. | | |
| 2014/0189306 A1 | 7/2014 | Merten et al. | | |
| 2014/0189331 A1 | 7/2014 | Lipshits et al. | | |

OTHER PUBLICATIONS

International Search Report and Written Opinion for Application No. PCT/US2016/063888, dated Mar. 7, 2017, 10 pages.

\* cited by examiner

*Primary Examiner* — Eric Coleman
(74) *Attorney, Agent, or Firm* — Nicholson De Vos Webster & Elliott LLP

(57) ABSTRACT

An apparatus and method for detecting and eliminating loop-invariant instructions. For example, one embodiment of a method comprises: detecting a loop start; responsively setting the loop-invariant bit for each register entry in a register alias table; executing first N iterations of the loop and responsively clearing the loop-invariant bit of any register modified during the first N iterations of the loop; identifying one or more loop-invariant registers based on the status of the loop-invariant bit in the register alias table; identifying one or more loop-invariant instructions based on the loop-invariant registers; and propagating the identified loop-invariant instructions by storing the destination register's values in a physical register file for later reuse by other instructions.

16 Claims, 12 Drawing Sheets

| ID 1 | Physical Address 1 | Size 1 | Confidence Level 1 |
|---|---|---|---|
| ID 2 | Physical Address 2 | Size 2 | Confidence Level 2 |
| ID 3 | Physical Address 3 | Size 3 | Confidence Level 3 |
| ID 4 | Physical Address 4 | Size 4 | Confidence Level 4 |
| ID 5 | Physical Address 5 | Size 5 | Confidence Level 5 |
| ⋮ | ⋮ | ⋮ | ⋮ |
| ID N | Physical Address N | Size N | Confidence Level N |

FIG. 4

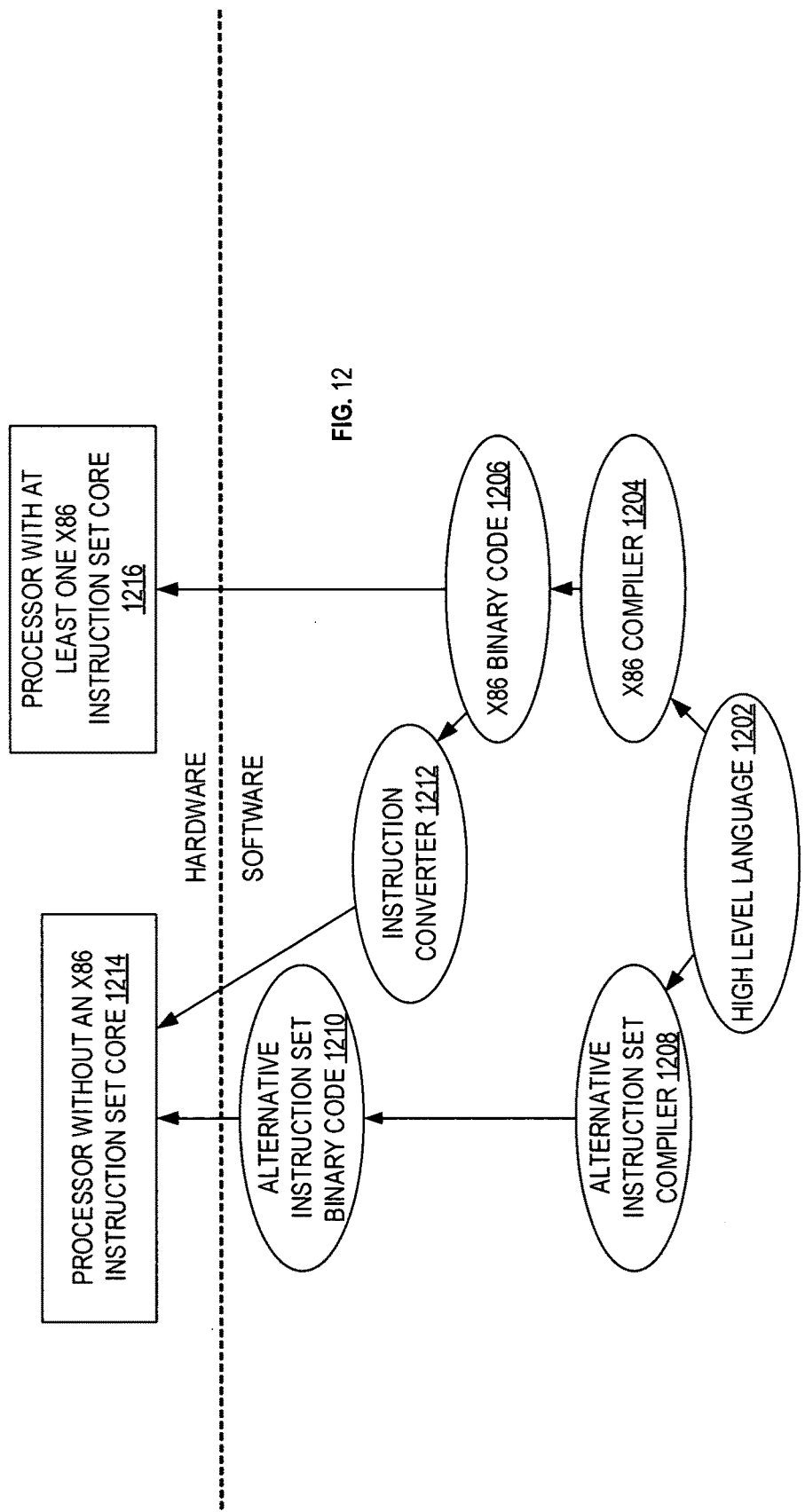

METHOD AND APPARATUS FOR LOOP-INVARIANT INSTRUCTION DETECTION AND ELIMINATION

BACKGROUND

Field of the Invention

This invention relates generally to the field of computer processors. More particularly, the invention relates to an apparatus and method for loop-invariant instruction detection and deletion.

Description of the Related Art

In computer programming, loop-invariant code consists of statements or expressions in a loop that do not change from iteration to iteration. This means that loop-invariant code may be moved outside the body of a loop to be computed at once without affecting the semantics of the computer program. Loop-Invariant Code Motion (LICM), a computer optimization that performs this movement automatically, is one of the most widely used compiler optimizations in computer architecture. However, in many cases, a compiler is unable to perform this advantageous optimization due to reasons such as: 1) lack of architectural registers to keep track of all the loop-invariant values; 2) inability to prove loop invariance because of unresolved memory conflicts (i.e., compiler is unable to prove that loads within the loop are not colliding with other store references); and/or 3) loop invariance's dependence on the control flow (i.e., loop invariance is conditional and known only at runtime). Moreover, all currently known solutions require binary translation assisted micro-architecture and assist of software compiler to perform loop-invariant code detection and elimination that are complicated and costly to implement.

BRIEF DESCRIPTION OF THE DRAWINGS

A better understanding of the present invention can be obtained from the following detailed description in conjunction with the following drawings, in which:

FIG. 4 illustrates an exemplary MEMORY GUARD structure according to one embodiment.

FIG. 12 illustrates a block diagram contrasting the use of a software instruction converter to convert binary instructions in a source instruction set to binary instructions in a target instruction set according to embodiments of the invention;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Figure 1:
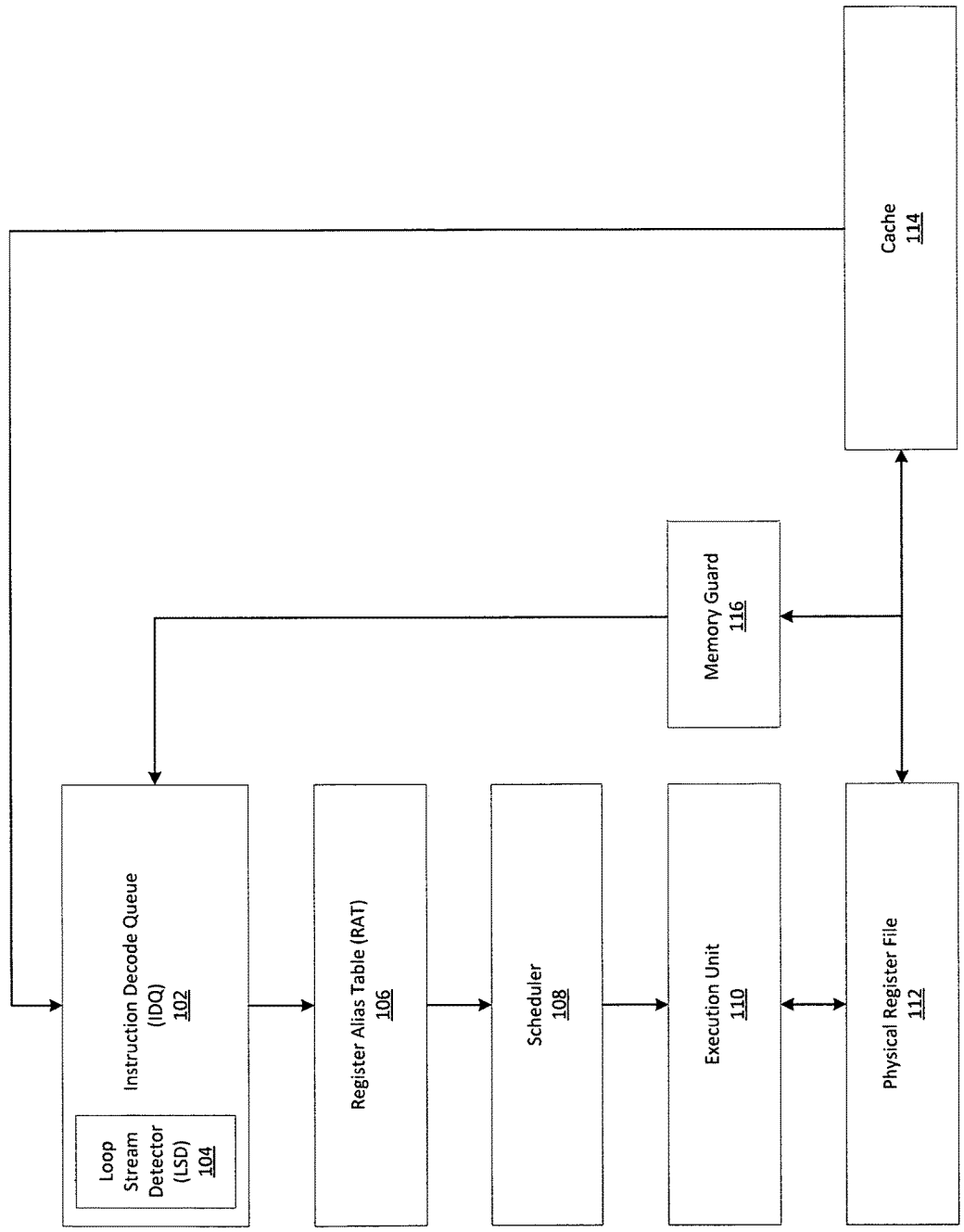
FIG. 1 is a block diagram illustrating an exemplary processor system platform according to one embodiment.

Embodiments of apparatus and methods for loop-invariant instruction detection and elimination are described herein. One embodiment of the invention detects loop-invariant instructions directly during loop execution by the CPU and responsively marks them for elimination. FIG. 1 is a block diagram illustrating an exemplary processor system platform according to one embodiment. The processor system platform includes an Instruction Decode Queue (IDQ) 102, a Register Alias Table (RAT) 106, a Scheduler 108, an Execution Unit 110, a Physical Register File 112, a system cache 114, and a Memory Guard 116, connected through a high-speed system bus or interconnect. In one embodiment, the IDQ 102 further includes a hardware loop tracker, such as a Loop Stream Detector (LSD) 104. The LSD is used to provide loop-specific information to the RAT. In one embodiment, the information provided to the RAT are two indications attached to fetched instructions. The first indication is whether an instruction to be executed by the execution unit is part of a loop. And if so, the second indication specifies, if applicable, whether the loop instruction is a loop start or a loop end. Loop start and loop end indications are used to track the loop iteration count. While an LSD is mentioned herein, one skilled in the arts would appreciate that other types of hardware and/or software loop tracker capable of providing loop-specific information can also be used. Embodiments of the invention do not depend on the use of any particular type of loop tracker.

Figure 2:
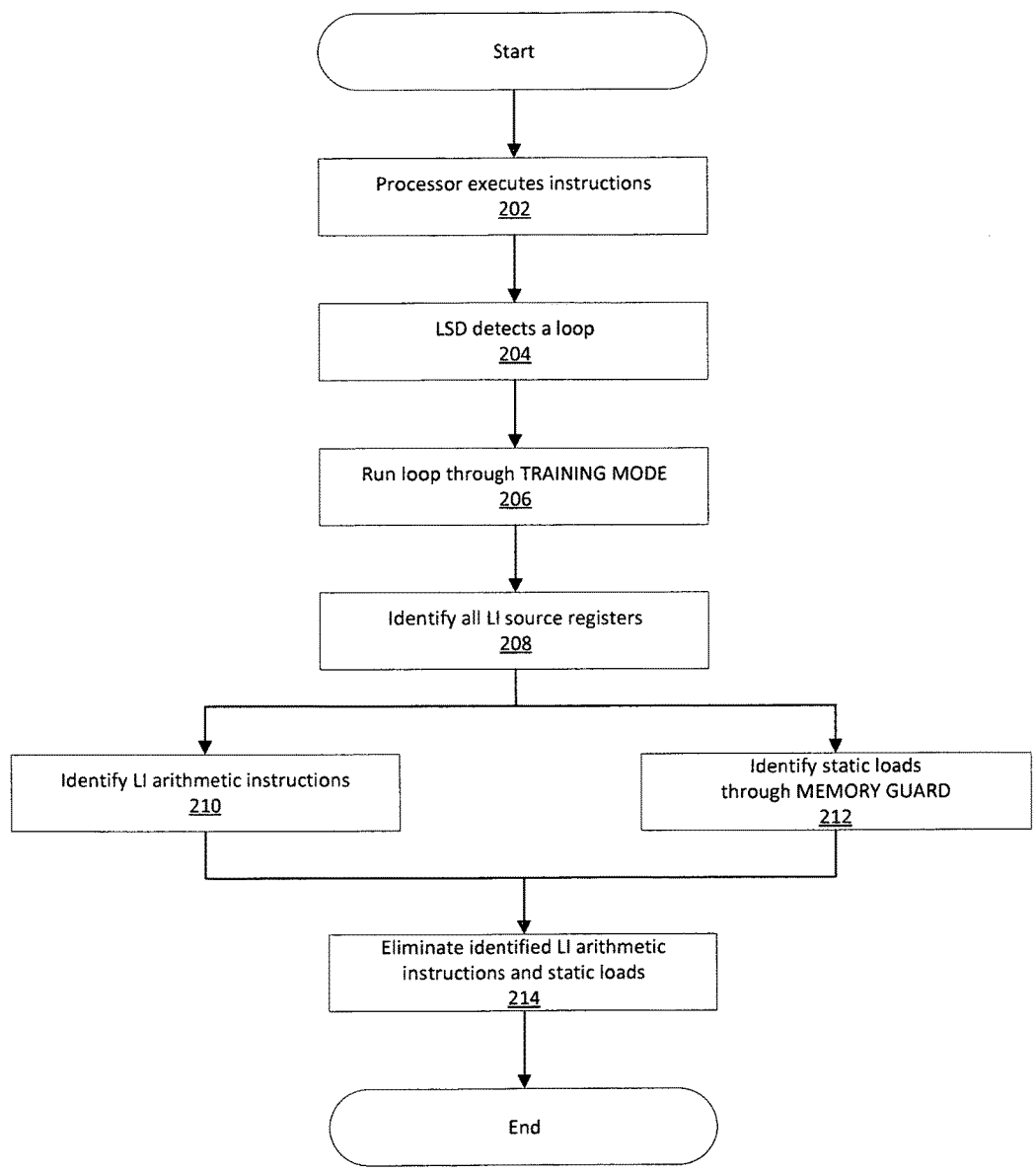
FIG. 2 is a high-level flow diagram illustrating the detection and elimination of loop-invariant instructions according to one embodiment.

FIG. 2 illustrates a high-level flow diagram of the detection and elimination of loop-invariant instructions according to one embodiment. In block 202, an instruction is processed by the processor. In block 204, the LSD detects the instruction is the start of a loop. In response to the loop detection, TRAINING MODE is triggered in block 206. At the conclusion of TRAINING MODE, in block 208, all loop-invariant source registers are identified by the RAT. In block 210, all loop-invariant arithmetic instructions are identified based on loop-invariant source registers. In block 212, all static loads are identified through the MEMORY GUARD. In block 214, all identified loop-invariant arithmetic instructions and static loads are eliminated.

A loop-invariant instruction is detected if all of its sources (i.e. source registers) are loop-invariant (i.e. not written to during loop execution). In one embodiment, the RAT, which maintains a mapping of all architectural registers to physical registers, is incorporated with a loop-invariant bit. For every architectural register tracked by the RAT, a loop-invariant bit is added to its corresponding entry in the RAT. The loop-invariant bit of an RAT entry indicates whether or not the tracked architectural register is loop-invariant (i.e., not written to during loop execution). In one embodiment, upon detecting a loop start instruction, the LSD signals the RAT which, in turn, responsively sets the loop-invariant bit on all of its architectural register entries. Thus, effectively, every architectural register tracked by the RAT is presumed to be loop-invariant at the start of the loop. Then, as the instructions inside the loops are executed, the loop-invariant bit of the RAT entries are updated as the corresponding architectural registers are modified.

In one embodiment, the first two iterations of a loop are used as TRAINING MODE in which the loop is executed as normal with no instruction marked for elimination. During TRAINING MODE, every instruction that writes to an architectural register also clears the loop-invariant bit in the RAT entry for that register. After the first iteration of the loop, all intra-iteration dependencies are found as any register that has been modified during the first iteration of the loop will have its loop-invariant bit cleared in the RAT. After the second iteration of the loop, all inter-iteration dependencies are found as any register that has been modified by cross-iteration instructions will now have its loop-invariant bit cleared in the RAT. After completion of TRAINING MODE, any register that still has its loop-invariant bit set in its corresponding RAT now contains loop-invariant values. While TRAINING MODE described in this embodiment encompasses only the first two iterations of a loop, one skilled in the arts would appreciate that any number or combination of the loop iterations may be used as TRAINING MODE to account for different loop structures. In any event, the number of loop iterations that comprise the TRAINING MODE should preferably be less than the total number of loop iterations in order to realize the benefits provided by the elimination of loop-invariant instructions.

Figure 3:
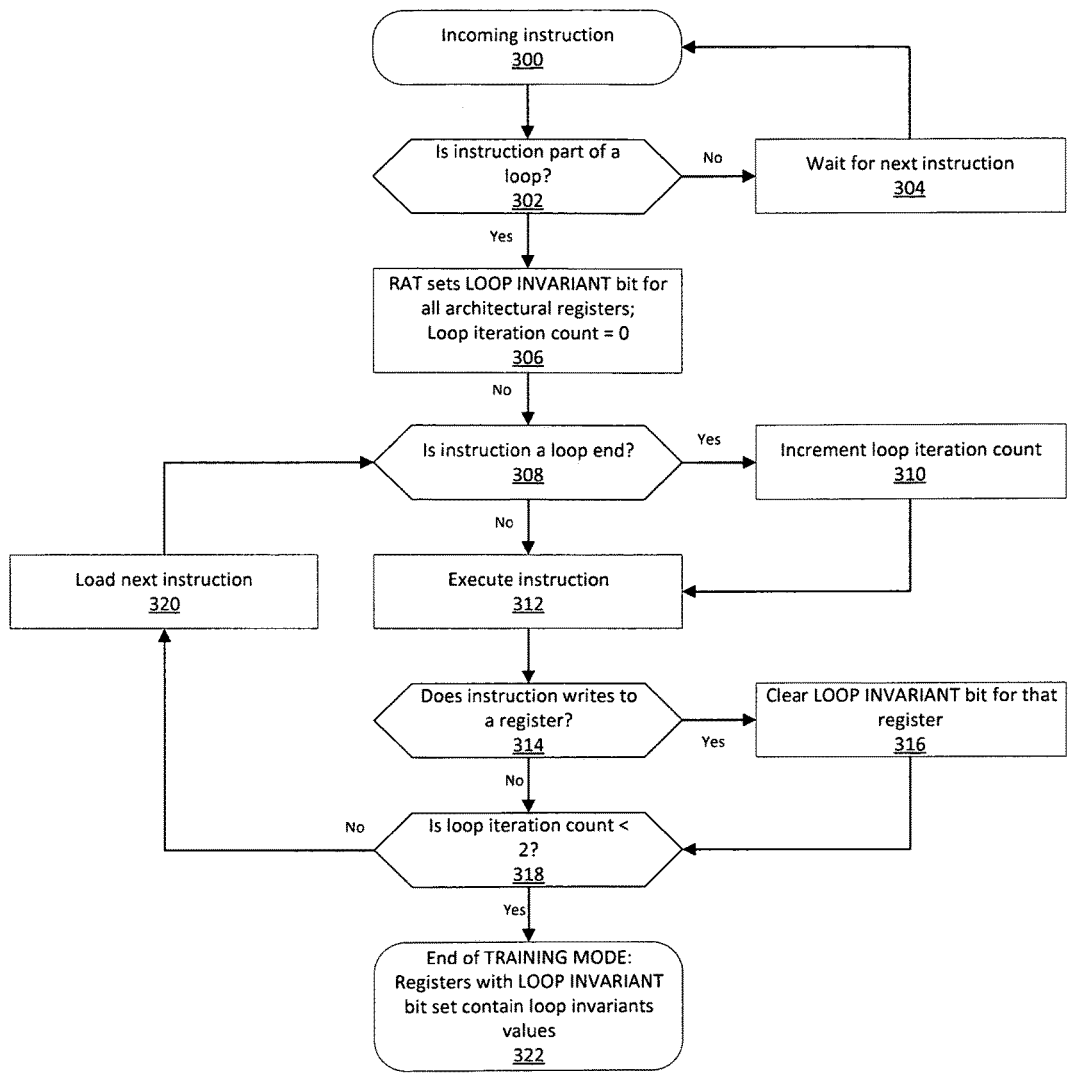
FIG. 3 is a block diagram illustrating the operation and logic of TRAINING MODE that consists of two loop iterations according to one embodiment.

FIG. 3 is a block diagram illustrating the operation and logic of TRAINING MODE that consists of two loop iterations according to one embodiment. At block 300, the LSD receives and examines an incoming instruction to be executed by the execution unit. At block 302, the LSD determines whether the instruction is part of a loop. If the instruction is not part of a loop, no action is taken and the LSD waits for the next instruction at block 304. On the other hand, if the instruction is part of a loop, the LSD would signal the RAT, at block 306, to responsively reset the loop-invariant bit in all of its architectural register entries. Next, in block 308, the LSD checks whether the instruction is a loop end. If a loop end is detected, the loop iteration count is incremented in block 310. After updating the iteration count, or if the instruction is not a loop end, the instruction is executed in block 312. As the instruction executes, any writes or modifications to the registers are monitored by the RAT in block 314. Any detected write or modification to a register by the instruction would cause the loop-invariant bit in that register's RAT entry to be cleared in block 316. After the instruction is executed and, if applicable, the corresponding RAT entry updated, the iteration count is checked against the number of loop iterations designated as TRAINING MODE (e.g., 2 according to this embodiment) in block 318. If the iteration count is less than the number of loop iterations designated as TRAINING MODE, the next instruction in the loop is loaded in block 320 and the process returns to block 308 for loop end detection. The process is repeated until the loop iteration count reaches the number of loop iterations designated as TRAINING MODE. This signifies the completion of loop dependency detection as illustrated by block 322. As discussed above, at the end of the first loop iteration, all intra-iteration dependencies are discovered as the loop-invariant bit is cleared for any registers modified during the first iteration. Then, after the second loop iteration, all inter-iteration dependencies are found as the loop-invariant bit is cleared for any registers modified during the second iteration. At this point, any register with a loop-invariant bit still set in its corresponding RAT entry would contain values that are loop-invariant because these values have not been modified during the first two iterations of the loop. Consequently, any instruction that utilizes only these registers as its source register would also be loop-invariant as it does not have any intra- or inter-iteration dependencies.

In theory, an instruction with all of its sources loop-invariant is itself loop-invariant and should be eliminated. However, this typically only holds true for arithmetic instructions. For instructions that utilize source registers containing references to other memory locations (i.e. caches), even though the reference to a memory location stored in the source register is loop-invariant (i.e. not modified by other instructions in the loop), the actual content stored at the referenced memory location may have been changed by other instructions. Those changes would not be captured or reflected by the loop-invariant bit in the RAT. Thus, for loop-invariant instructions that reference other memory locations, such as a load, an extra verification step is required to ensure that the referenced memory location are not modified by other instructions during the execution of the loop. Thus, according to one embodiment, along with the execution of any load instruction that has all of its sources loop-invariant, the following tasks are performed:

Allocate a dedicated entry in a MEMORY GUARD structure to track the physical address and size of the load in the load instruction.

Every store instruction (from the loop iteration) or external snoop (store instruction originated from another thread) is checked against the MEMORY GUARD entries for conflict.

Each MEMORY GUARD entry has a field for tracking a confidence level such that each loop-invariant load instruction hit to an entry would increment the confidence level for that entry, while each store instruction or external snoop hit would clear and lock the entry's confidence level to zero.

A loop-invariant load instruction accessing a MEMORY GUARD entry that has a confidence level higher than a pre-determined threshold (e.g., "3") is deemed a static load instruction and ready for elimination just like a loop-invariant arithmetic instruction.

FIG. 4 illustrates the MEMORY GUARD structure according to one embodiment. Each entry contains a physical address, size, and confidence level. The physical address is the address of the memory location referenced by the load instruction. The size field tracks the size of the data stored at the physical address. The confidence level field is used to indicate the likelihood that a referenced memory location is loop-invariant. A confidence level greater than 0 would also serve as an indication of the number of times that the memory location corresponding to the physical address has been accessed by the same or other load instructions. A confidence level field locked to zero means that the corresponding memory location has been written to or modified by at least one store instruction or external snoop during loop execution. Accordingly, any load instruction that accesses that memory location is not loop-invariant.

Figure 5:
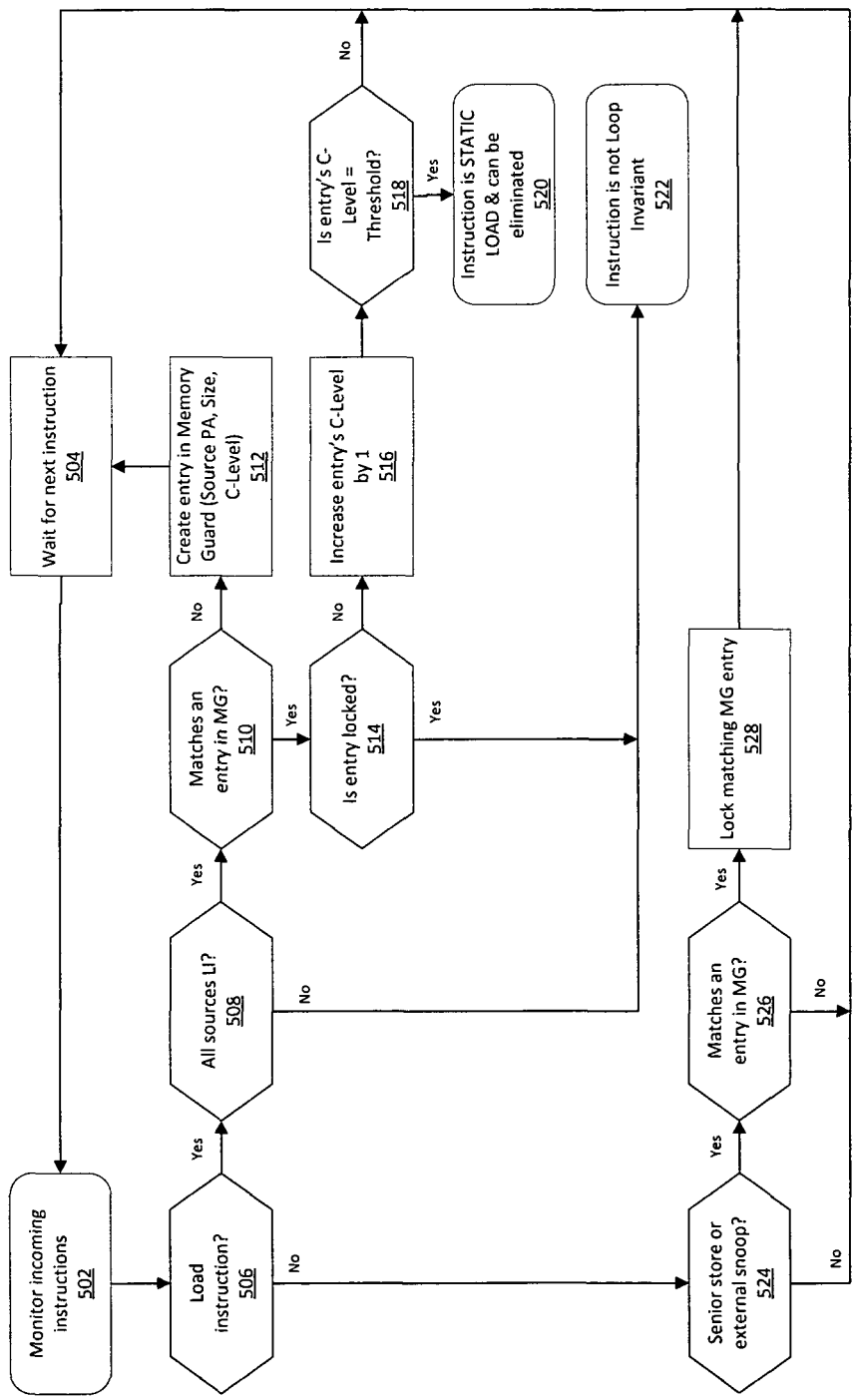
FIG. 5 illustrates the operation and logic of the MEMORY GUARD according to an exemplary embodiment.

FIG. 5 illustrates the operation and logic of the MEMORY GUARD according to an exemplary embodiment. In block 502, the MEMORY GUARD monitors accesses to the cache. Upon detecting such access, MEMORY GUARD determines whether the memory access is a load instruction in block 506, and if so, MEMORY GUARD further determines whether all of the source registers for the detected load instruction are loop-invariant in block 508. In one embodiment, this is done so by checking the RAT to see if each source register's corresponding RAT entry has its loop-invariant bit set. If the source registers of a load instruction are not all loop-invariant, the load instruction itself, as shown in block 522, cannot be loop-invariant. However, if all source registers of a load instruction are loop-invariant, the MEMORY GUARD next checks its list of entries, at block 510, for a match with the load instruction.

A match in MEMORY GUARD indicates the physical address in the load instruction matches the physical address field of a MEMORY GUARD entry. In the event of that no match is found, a new MEMORY GUARD entry for the load instruction is created in block 512 and then the MEMORY GUARD returns to monitoring for memory accesses in block 504. If, on the other hand, a match was found, the MEMORY GUARD next determines, in block 514, whether or not the confidence level of the matching entry is locked to zero. A locked entry would indicate that the memory location to be accessed by the current load instruction has already been written to or modified by at least one prior instruction during loop iteration. In block 522, if such is the case, the current load instruction cannot be loop-invariant.

In the event that the entry is not locked, the matching entry's confidence level is incremented by one in block 516 and then checked against a pre-determined threshold in block 518. If the incremented confidence level equals the pre-determined threshold, indicating that the corresponding memory location has been accessed by one or more load instructions for at least the pre-determined number of times without the memory location being overwritten or modified by an intervening store or snoop instruction, the load instruction is marked as a loop-invariant static load in block 520. Conversely, if the confidence level has not yet reach the pre-determined threshold, it means that there has not been enough loop iterations for the memory location to be considered loop-invariant. Accordingly, the load instruction accessing this memory location cannot be safely deemed loop-invariant. In block 504, the MEMORY GUARD returns to monitoring for memory accesses.

In addition to tracking memory accesses by load instructions, according to an embodiment, the MEMORY GUARD also verifies that the data in memory locations deemed loop-invariant are not subsequently modified and may therefore be reused without having to re-execute loop-invariant instructions. Referring back to FIG. 5, besides monitoring for load instructions in block 506, the MEMORY GUARD also monitors for store instructions and external snoops in block 524. A detected store instruction or external snoop is checked against the entries in MEMORY GUARD in block 526. If a matching entry is found, indicating that the store instruction or external snoop is attempting to modify a memory location that has been accessed by other load instructions, the MEMORY GUARD next checks to see whether or not the memory location in question is already marked as loop-invariant. The MEMORY GUARD does so by comparing the matching entry's confidence level with the pre-determined threshold in block 527. If the confidence level is lower than the threshold, indicating that the memory location has not yet been deemed loop-invariant, the matching MEMORY GUARD entry is locked in block 528, effectively taking the corresponding memory address out of loop-invariancy consideration. On the other hand, if the confidence level of the matching entry has already reached the pre-determined threshold in block 527, it means at least one load instruction has already been deemed loop-invariant (i.e., static load) and possibly been deleted from the instruction pipeline. In such case, appropriate corrective measures, such as pipeline flush and loop termination, are triggered in block 530.

According to one embodiment, loop-invariant arithmetic instructions and static loads that are identified and marked for elimination will also have the loop-invariant bit of their destination register set in the RAT. This allows loop-invariant information to be propagated and reused by subsequent instructions in the loop. This is the only way a loop-invariant bit could be set on a register entry in the RAT outside of the initial TRAINING MODE. In one embodiment, in addition to setting the loop-invariant bit, the destination value for each identified loop-invariant arithmetic instruction and static load is saved for future re-use. For systems with a Physical Register File (PRF), the destination value is locked in the PRF register to avoid register deallocation and are be made available to instructions in subsequent loop iterations. The locked PRF register is reclaimed when the loop execution ends. In another embodiment, a system without PRF utilizes a suitable, dedicated structure to store the destination value. The destination value is copied to the dedicated structure and re-used (i.e., read from the dedicated structure) by any consumer of the value. At the end of the loop execution, all the stored destination values are purged from the dedicated structure.

According to an embodiment, the actual elimination of loop-invariant arithmetic instructions and static loads is handled by the RAT. As the loop-invariant instructions are processed by the RAT at allocation, they are eliminated (e.g., dropped) and thus not passed onto the scheduler or execution unit. Rather, the RAT verifies that each of the instruction's destination register is loop-invariant and identifies, for each marked loop-invariant instruction, the PRF entry containing the destination value. In one embodiment, once the loop execution finishes, all loop-invariant bits are cleared in the RAT and the detection and elimination of loop-invariant instructions is suspended until a next loop is detected. In another embodiment, all MEMORY GUARD entries are released at the end of loop execution.

Figure 6:
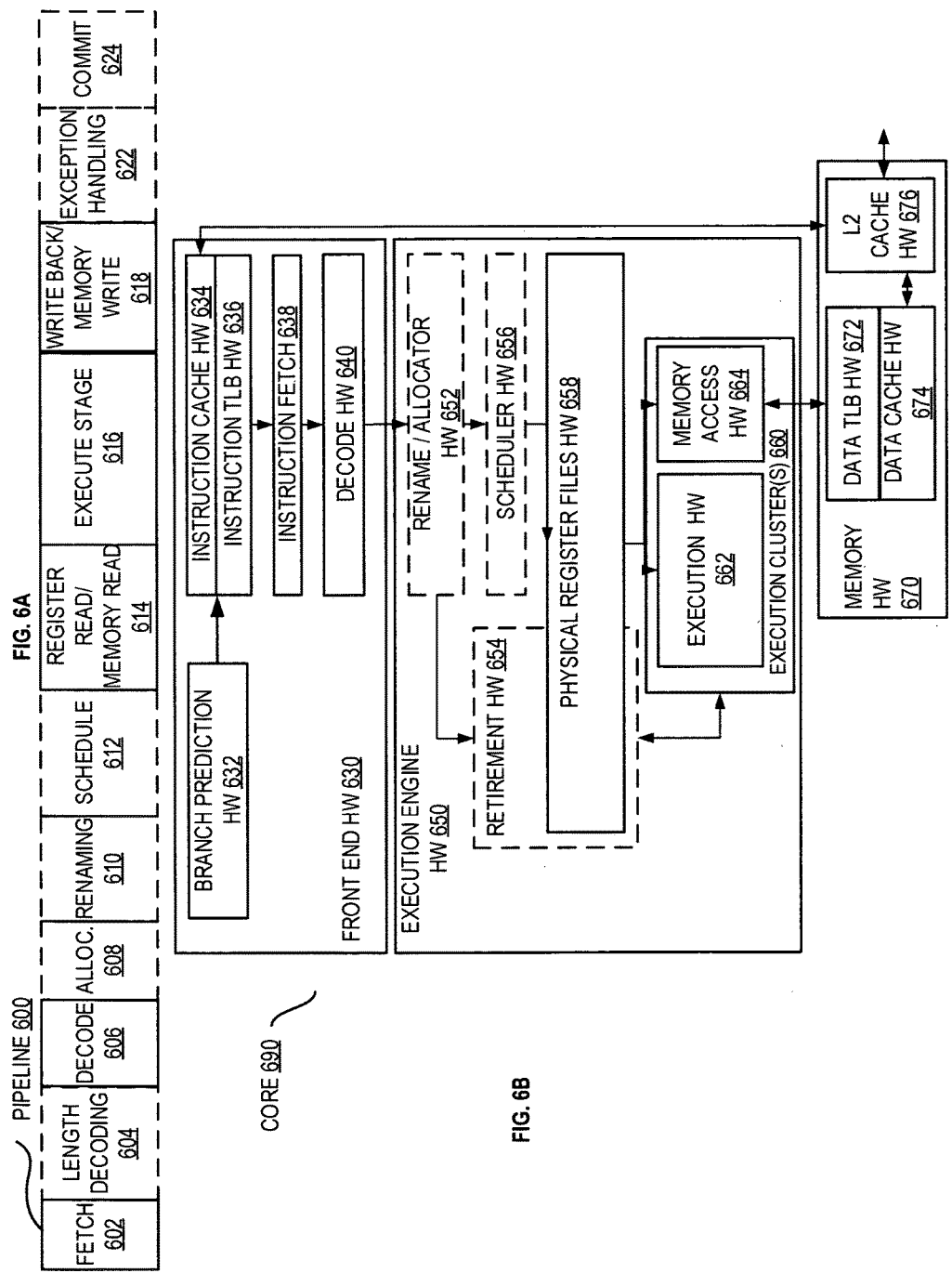
FIG. 6A is a block diagram illustrating both an exemplary in-order pipeline and an exemplary register renaming, out-of-order issue/execution pipeline according to embodiments of the invention.
FIG. 6B is a block diagram illustrating both an exemplary embodiment of an in-order architecture core and an exemplary register renaming, out-of-order issue/execution architecture core to be included in a processor according to embodiments of the invention.

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end hardware 630 coupled to an execution engine hardware 650, and both are coupled to a memory hardware 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end hardware 630 includes a branch prediction hardware 632 coupled to an instruction cache hardware 634, which is coupled to an instruction translation lookaside buffer (TLB) 636, which is coupled to an instruction fetch hardware 638, which is coupled to a decode hardware 640. The decode hardware 640 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode hardware 640 or otherwise within the front end hardware 630). The decode hardware 640 is coupled to a rename/allocator hardware 652 in the execution engine hardware 650.

The execution engine hardware 650 includes the rename/allocator hardware 652 coupled to a retirement hardware 654 and a set of one or more scheduler hardware 656. The scheduler hardware 656 represents any number of different schedulers, including reservations stations, central instruction window, etc. The scheduler hardware 656 is coupled to the physical register file(s) hardware 658. Each of the physical register file(s) hardware 658 represents one or more physical register files, different ones of which store one or more different data types, such as scalar integer, scalar floating point, packed integer, packed floating point, vector integer, vector floating point status (e.g., an instruction pointer that is the address of the next instruction to be executed), etc. In one embodiment, the physical register file(s) hardware 658 comprises a vector registers hardware, a write mask registers hardware, and a scalar registers hardware. These register hardware may provide architectural vector registers, vector mask registers, and general purpose registers. The physical register file(s) hardware 658 is overlapped by the retirement hardware 654 to illustrate various ways in which register renaming and out-of-order execution may be implemented (e.g., using a reorder buffer (s) and a retirement register file(s); using a future file(s), a history buffer(s), and a retirement register file(s); using a register maps and a pool of registers; etc.). The retirement hardware 654 and the physical register file(s) hardware 658 are coupled to the execution cluster(s) 660. The execution cluster(s) 660 includes a set of one or more execution hardware 662 and a set of one or more memory access hardware 664. The execution hardware 662 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 656, physical register file(s) hardware 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 664). It should also be understood that where separate pipelines are used, one or more of these pipelines may be out-of-order issue/execution and the rest in-order.

The set of memory access hardware 664 is coupled to the memory hardware 670, which includes a data TLB hardware 672 coupled to a data cache hardware 674 coupled to a level 2 (L2) cache hardware 676. In one exemplary embodiment, the memory access hardware 664 may include a load hardware, a store address hardware, and a store data hardware, each of which is coupled to the data TLB hardware 672 in the memory hardware 670. The instruction cache hardware 634 is further coupled to a level 2 (L2) cache hardware 676 in the memory hardware 670. The L2 cache hardware 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode hardware 640 performs the decode stage 606; 3) the rename/allocator hardware 652 performs the allocation stage 608 and renaming stage 610; 4) the scheduler hardware 656 performs the schedule stage 612; 5) the physical register file(s) hardware 658 and the memory hardware 670 perform the register read/memory read stage 614; the execution cluster 660 perform the execute stage 616; 6) the memory hardware 670 and the physical register file(s) hardware 658 perform the write back/memory write stage 618; 7) various hardware may be involved in the exception handling stage 622; and 8) the retirement hardware 654 and the physical register file(s) hardware 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 634/674 and a shared L2 cache hardware 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
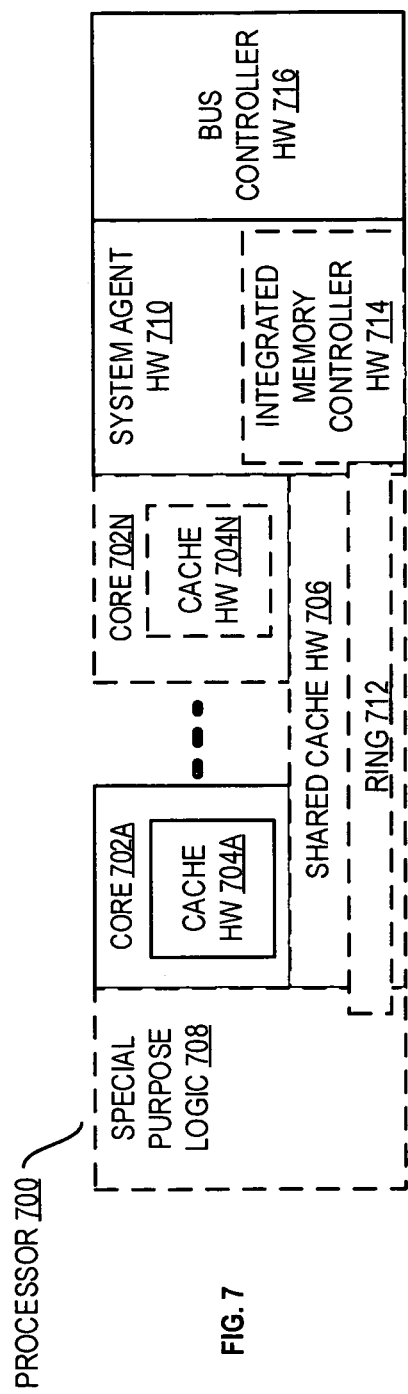
FIG. 7 is a block diagram of a single core processor and a multicore processor with integrated memory controller and graphics according to embodiments of the invention.

FIG. 7 is a block diagram of a processor 700 that may have more than one core, may have an integrated memory controller, and may have integrated graphics according to embodiments of the invention. The solid lined boxes in FIG. 7 illustrate a processor 700 with a single core 702A, a system agent 710, a set of one or more bus controller hardware 716, while the optional addition of the dashed lined boxes illustrates an alternative processor 700 with multiple cores 702A-N, a set of one or more integrated memory controller hardware 714 in the system agent hardware 710, and special purpose logic 708.

Thus, different implementations of the processor 700 may include: 1) a CPU with the special purpose logic 708 being integrated graphics and/or scientific (throughput) logic (which may include one or more cores), and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics and/or scientific (throughput); and 3) a coprocessor with the cores 702A-N being a large number of general purpose in-order cores. Thus, the processor 700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 706, and external memory (not shown) coupled to the set of integrated memory controller hardware 714. The set of shared cache hardware 706 may include one or more mid-level caches, such as level 2 (L2), level 3 (L3), level 4 (L4), or other levels of cache, a last level cache (LLC), and/or combinations thereof. While in one embodiment a ring based interconnect hardware 712 interconnects the integrated graphics logic 708, the set of shared cache hardware 706, and the system agent hardware 710/integrated memory controller hardware 714, alternative embodiments may use any number of well-known techniques for interconnecting such hardware. In one embodiment, coherency is maintained between one or more cache hardware 706 and cores 702-A-N.

In some embodiments, one or more of the cores 702A-N are capable of multi-threading. The system agent 710 includes those components coordinating and operating cores 702A-N. The system agent hardware 710 may include for example a power control unit (PCU) and a display hardware. The PCU may be or include logic and components needed for regulating the power state of the cores 702A-N and the integrated graphics logic 708. The display hardware is for driving one or more externally connected displays.

The cores 702A-N may be homogenous or heterogeneous in terms of architecture instruction set; that is, two or more of the cores 702A-N may be capable of execution the same instruction set, while others may be capable of executing only a subset of that instruction set or a different instruction set. In one embodiment, the cores 702A-N are heterogeneous and include both the "small" cores and "big" cores described below.

FIGS. 8-11 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
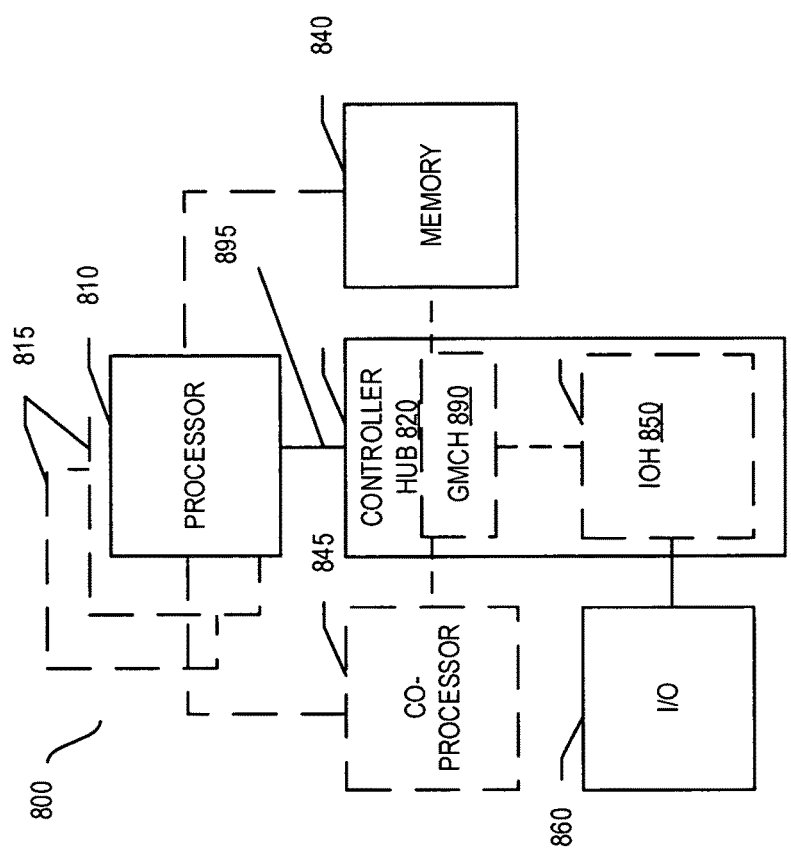
FIG. 8 illustrates a block diagram of a system in accordance with one embodiment of the present invention.

Referring now to FIG. 8, shown is a block diagram of a system 800 in accordance with one embodiment of the present invention. The system 800 may include one or more processors 810, 815, which are coupled to a controller hub 820. In one embodiment the controller hub 820 includes a graphics memory controller hub (GMCH) 890 and an Input/Output Hub (IOH) 850 (which may be on separate chips); the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 700.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface, or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9:
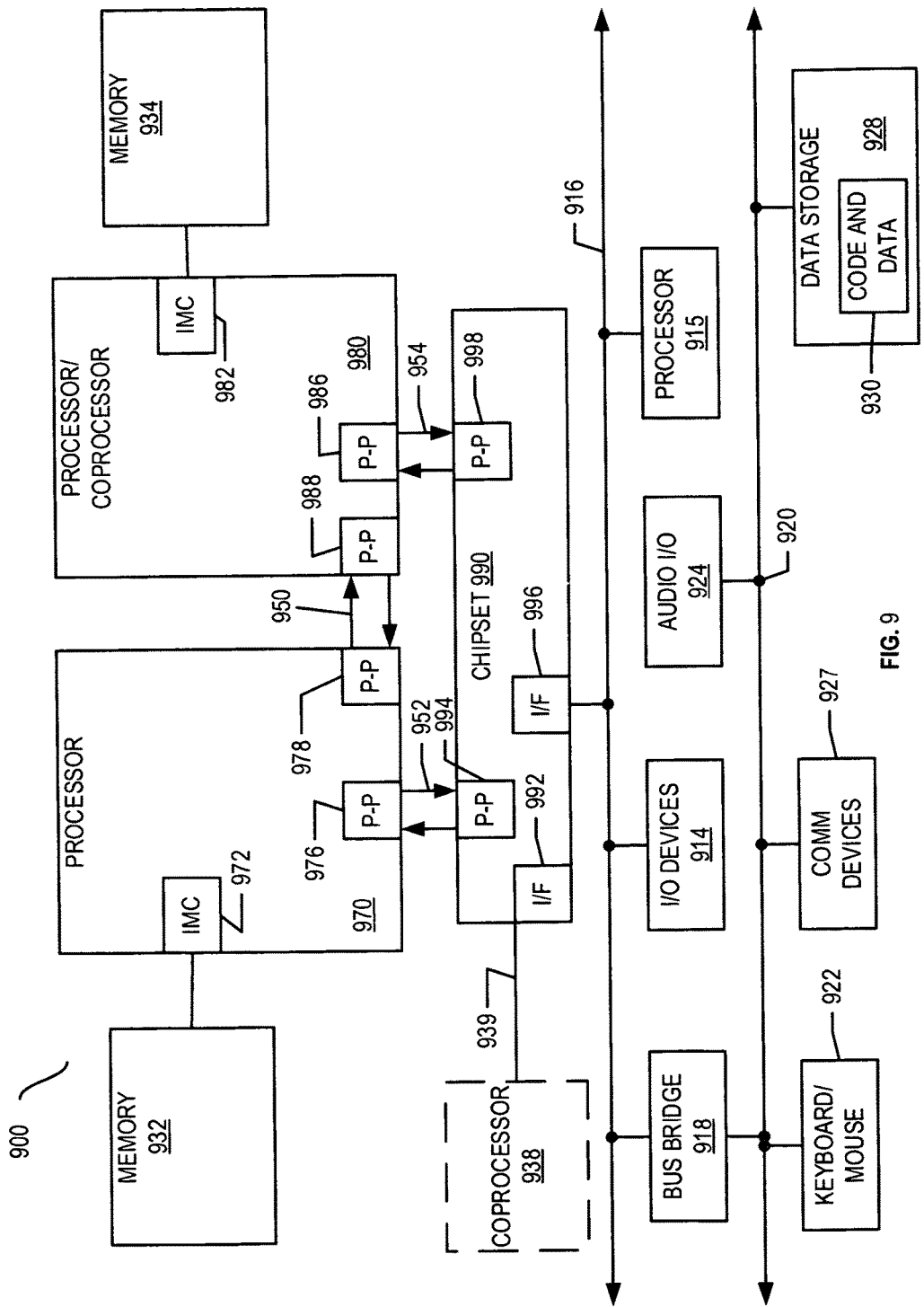
FIG. 9 illustrates a block diagram of a second system in accordance with an embodiment of the present invention.

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 700. In one embodiment of the invention, processors 970 and 980 are respectively processors 810 and 815, while coprocessor 938 is coprocessor 845. In another embodiment, processors 970 and 980 are respectively processor 810 coprocessor 845.

Processors 970 and 980 are shown including integrated memory controller (IMC) hardware 972 and 982, respectively. Processor 970 also includes as part of its bus controller hardware point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) hardware), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage hardware 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Figure 10:
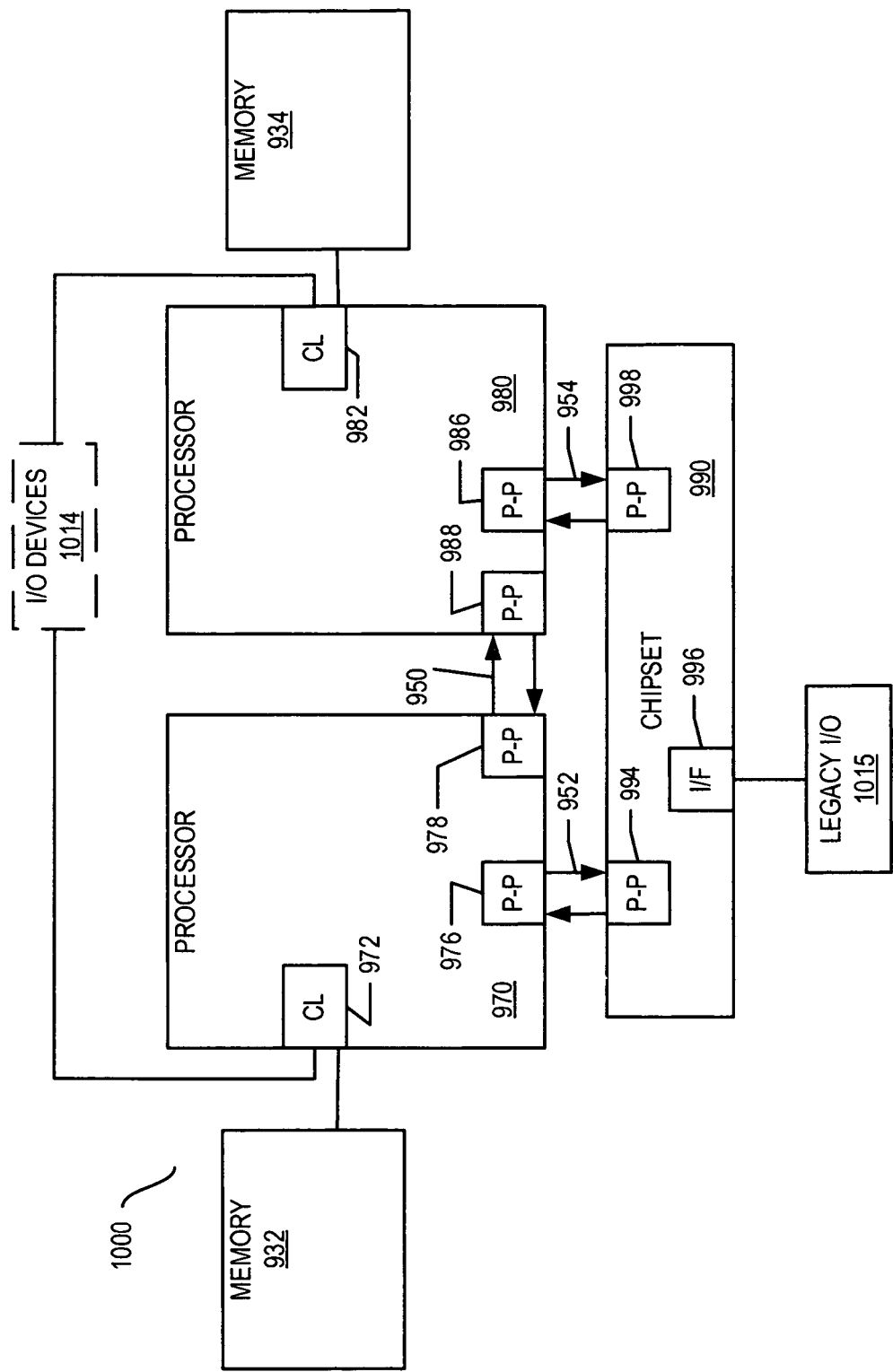
FIG. 10 illustrates a block diagram of a third system in accordance with an embodiment of the present invention.

Referring now to FIG. 10, shown is a block diagram of a second more specific exemplary system 1000 in accordance with an embodiment of the present invention. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processors 970, 980 may include integrated memory and I/O control logic ("CL") 972 and 982, respectively. Thus, the CL 972, 982 include integrated memory controller hardware and include I/O control logic. FIG. 10 illustrates that not only are the memories 932, 934 coupled to the CL 972, 982, but also that I/O devices 1014 are also coupled to the control logic 972, 982. Legacy I/O devices 1015 are coupled to the chipset 990.

Figure 11:
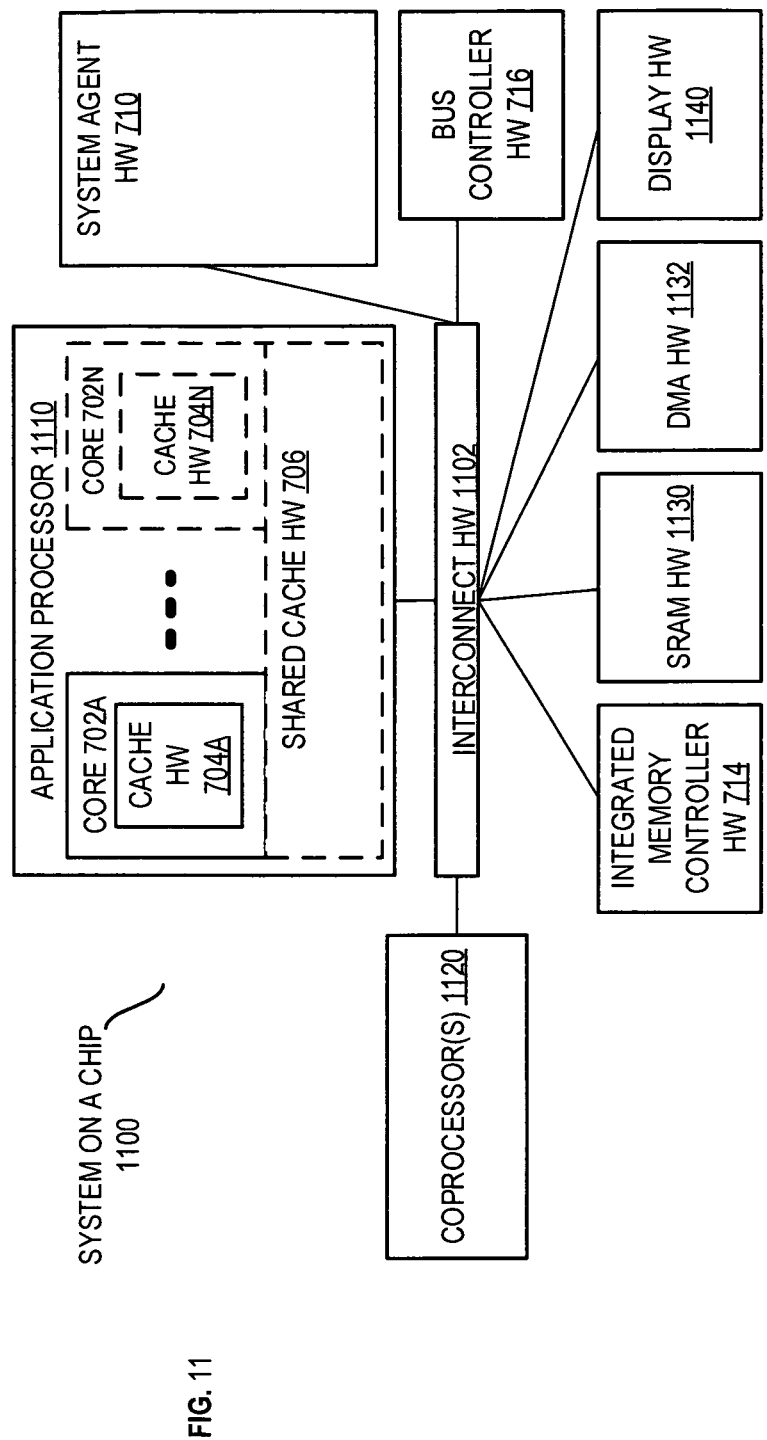
FIG. 11 illustrates a block diagram of a system on a chip (SoC) in accordance with an embodiment of the present invention.

Referring now to FIG. 11, shown is a block diagram of a SoC 1100 in accordance with an embodiment of the present invention. Similar elements in FIG. 7 bear like reference numerals. Also, dashed lined boxes are optional features on more advanced SoCs. In FIG. 11, an interconnect hardware 1102 is coupled to: an application processor 1110 which includes a set of one or more cores 702A-N and shared cache hardware 706; a system agent hardware 710; a bus controller hardware 716; an integrated memory controller hardware 714; a set or one or more coprocessors 1120 which may include integrated graphics logic, an image processor, an audio processor, and a video processor; an static random access memory (SRAM) hardware 1130; a direct memory access (DMA) hardware 1132; and a display hardware 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 12 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 12 shows a program in a high level language 1202 may be compiled using an x86 compiler 1204 to generate x86 binary code 1206 that may be natively executed by a processor with at least one x86 instruction set core 1216. The processor with at least one x86 instruction set core 1216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1204 represents a compiler that is operable to generate x86 binary code 1206 (e.g., object code) that can, with or without additional linkage processing, be executed on the processor with at least one x86 instruction set core 1216. Similarly, FIG. 12 shows the program in the high level language 1202 may be compiled using an alternative instruction set compiler 1208 to generate alternative instruction set binary code 1210 that may be natively executed by a processor without at least one x86 instruction set core 1214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1212 is used to convert the x86 binary code 1206 into code that may be natively executed by the processor without an x86 instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have an x86 instruction set processor or core to execute the x86 binary code 1206.

What is claimed is:

1. A method implemented in a hardware processor, the method comprising:
   setting a loop-invariant bit for each entry in a register alias table in response to detecting a loop start, wherein each entry in the register alias table corresponds to a register;
   executing first N iterations of the loop and for any register that is modified during the first N iterations of the loop, responsively clearing the loop-invariant bit of the modified register's corresponding entry in the register alias table;
   identifying one or more loop-invariant registers, wherein a given register is loop-invariant if the given register's corresponding entry in the register alias table has the loop-invariant bit still set after the first N iterations of the loop.

2. The method of claim 1, further comprises
   tracking accesses to a plurality of cache addresses in a processor cache;
   maintaining a counter for each of the plurality of cache addresses accessed by one or more load instructions and responsively incrementing the counter of an accessed cache address each time the accessed cache address is accessed by the one or more load instructions;
   locking the counter of any cache address that is modified by a first store instruction or a first remote snoop;
   determining whether a given cache address is loop-invariant based on the counter.

3. The method of claim 2, wherein the given cache address is loop-invariant if the counter of the given cache address is equal to or greater than a predetermined threshold and not loop-invariant if the counter of the given cache address is locked.

4. The method of claim 3, further comprises identifying one or more loop-invariant instructions inside the loop, wherein a given loop instruction loop-invariant if the given loop instruction is an arithmetic instruction comprised of only operands that are from loop-invariant registers, or if the given loop instruction is a load instruction that comprises of only operands stored in loop-invariant registers and is accessing only loop-invariant cache addresses.

5. The method of claim 4, further comprises identifying a destination register for each of the one or more identified loop-invariant instructions inside the loop and responsively setting the loop-invariant bit for each identified destination register's entry in the register alias table.

6. The method of claim 3, further comprises initiating corrective actions responsive to detecting a loop-invariant cache address being modified by a second store instruction or a second remote snoop.

7. The method of claim 6, wherein the corrective actions comprise flushing an instruction pipeline.

8. The method of claim 6, wherein the corrective actions comprise terminating the loop.

9. An apparatus comprising:
    a loop-detecting circuit to detect loops and upon detecting a loop start, responsively cause the setting of loop-invariant bit for each entry in a register alias table, wherein each entry in the register alias table corresponds to a register;
    an execution circuit to execute first N iterations of a detected loop and for any register that is modified during the first N iterations of the detected loop, responsively cause the clearing of the loop-invariant bit of the modified register's corresponding entry in the register alias table;
    a loop-invariant register detecting circuit to identify one or more loop-invariant registers, wherein a given register is loop-invariant if the given register's corresponding entry in the register alias table has the loop-invariant bit still set after the first N iterations of the detected loop.

10. The apparatus of claim 9, further comprises:
    a memory guard circuit to:
        track accesses to a plurality of cache addresses in a processor cache;
        maintain a counter for each of the plurality of cache addresses accessed by one or more load instructions and responsively incrementing the counter of an accessed cache address each time the accessed cache address is accessed by the one or more load instructions;
        lock the counter of any cache address that is modified by a first store instruction or a first remote snoop; and
        determine whether a given cache address is loop-invariant based on the counter.

11. The apparatus of claim 10, wherein the given cache address is loop-invariant if the counter of the given cache address is equal to or greater than a predetermined threshold and not loop-invariant if the counter of the given cache address is locked.

12. The apparatus of claim 11, further comprises a loop-invariant instruction detection circuit to identify one or more loop-invariant instructions inside the loop, wherein a given loop instruction is a loop invariant if the given loop instruction is an arithmetic instruction comprised of only operands that are from the loop-invariant registers, or if the given loop instruction is a load instruction that comprises of only operands stored in loop-invariant registers and is accessing only loop-invariant cache addresses.

13. The apparatus of claim 12, further comprises a loop-invariant instruction propagation circuit to identify a destination register for each of the one or more identified loop-invariant instructions inside the loop and responsively setting the loop-invariant bit for each identified destination register's entry in the register alias table.

14. The apparatus of claim 11, wherein the memory guard circuit to initiate corrective actions responsive to detecting a loop-invariant cache address being modified by a second store instruction or second remote snoop.

15. The apparatus of claim 14, wherein the corrective actions comprise flushing an instruction pipeline.

16. The apparatus of claim 14, wherein the corrective actions comprise terminating the loop.

\* \* \* \* \*